Patented Jan. 16, 1951

2,538,152

UNITED STATES PATENT OFFICE 2,538,152

ANTHRAQUINONE-AZOMETHINE DYESTUFFS

Paul Grossmann, Binningen, and Walter Kern, Sissach, Switzerland, assignors to Ciba Limited, Basel, Switzerland, a Swiss firm No Drawing. Application June 19, 1947, Serial No. 755,724. In Switzerland June 28, 1946

6 Claims. (Cl. 260—378)

According to this invention valuable dyestuffs of the anthraquinone series are made by converting into an azomethine group a suitable substituent present in the 2-position of a 1:4-diaminoanthraquinone, which may contain an aliphatically bound residue as a substituent in an amino group.

The 1:4-diaminoanthraquinones used as starting materials in this invention may therefore contain a free amino group in the 1-position and in the 4-position or one or other of these amino groups or both of them may contain an aliphatically bound residue as a substituent. As aliphatically bound residues there are to be understood those which are wholly of an aliphatic nature such as alkyl groups, especially those of the low molecular series, for example, methyl, ethyl β-hydroxy-ethyl, propyl, isopropyl, butyl or hexyl groups, or cycloalkyl groups, for example, cyclohexyl groups, and also other residues such, for example, as aralkyl groups, which are attached to the nitrogen atom of the amino group by an aliphatic residue, for example, the residue -CH₂-.

As suitable substituents occupying the 2-position there may be mentioned, more especially, aldehyde groups, and also methyl groups, which react in a corresponding manner under suitable conditions. For converting the substituent in the 2-position into an azomethine group there are especially suitable aromatic amines, especially those of the benzene series, for example, aniline, para-phenylene diamine and 1-amino-4-dimethyl-aminobenzene, but aliphatic, including cycloaliphatic and araliphatic amines, such as butyl-amine, ethanolamine, cyclohexylamine and benzylamine, are also suitable; especially suitable are those of the lower aliphatic series containing up to six carbon atoms.

The conversion of the substituent in the 2-position into an azomethine group may be carried out by a method in itself known. Thus, for example, it is easy to convert an aldehyde group in the 2-position into the corresponding azomethine by condensation with aniline. It is also known (see British Patent No. 153,055) to condense a methyl group in the 2-position with aniline in the presence of nitrobenzene, advantageously with the addition of an acid-binding agent, an azomethine being formed.

In a modification of the invention the same or analogous dyestuffs are made by converting into or exchanging for an amino group, which may contain an aliphatic substituent, a convertible or exchangeable substituent in the 4-position of a 1-aminoanthraquinone which contains in the 2-position an azomethine group. The azomethine groups present in the starting materials may correspond to the azomethine groups obtained in the process first described above, and as convertible or exchangeable substituents these starting materials may contain in the 4-position, for example, a nitro group or a halogen atom, for example, a chlorine atom or especially a bromine atom. Thus, if desired, a nitro group in the 4-position may be converted into an amino group by reduction.

The exchange of the substituent in the 4-position for a substituted or unsubstituted amino group may be carried out by the usual methods, for example, by reaction with an amine of aliphatic character (see, second paragraph of this specification) or by reaction with a sulfonamide, such as para-toluene sulfonamide, and subsequent hydrolysis of the SO₂-NH- linkage. It is also possible in a single operation to convert a suitable substituent in the 2-position into an azomethine group and to exchange a substituent in the 4-position for an amino group. This can be done, for example, by treating 1-amino-4-nitroanthraquinone-2-aldehyde with an aliphatic amine, whereby an aliphatic azomethine group is formed from the aldehyde group and the nitro group is exchanged for an aliphatically substituted amino group.

The dyestuffs of this invention may be used, for example, as pigment dyestuffs. They are also suitable for dyeing rayon made from super-polyamides or cellulose esters or ethers, especially the ordinary cellulose acetate rayon of commerce. They are soluble in the usual lacquer solvents and may find application as dyestuffs for lacquers.

Among other dyestuffs, there are obtained by this invention those yielding blue to green-blue dyeings which are very fast to light.

For use in dyeing cellulose acetate rayon it is of advantage to prepare with the aforesaid dyestuffs dyestuff preparations which contain the dyestuff in a state of very fine dispersion and also contain a protective colloid or dispersing agent favouring this state of dispersion.

The following examples illustrate the invention, the parts being by weight:

Example 1

30 parts of 1:4-diamino-2-methylanthraquinone are heated at the boil for about 3 hours in 210 parts of nitrobenzene with 6 parts of aniline and 15 parts of potassium carbonate. The whole is filtered hot and allowed to cool, whereupon 1:4-diaminoanthraquinone-2-anil of the formula

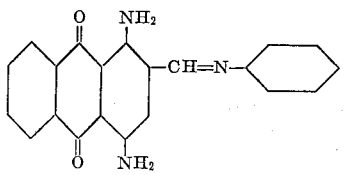

crystallises. The latter is separated by filtering with suction, and washed with alcohol. The dyestuff is a dark powder which dissolves in sulfuric acid with a dirty yellow coloration which turns towards green with paraformaldehyde. The dyestuff dissolves in organic solvents with a pure blue coloration and, after reprecipitation from sulfuric acid of 80 per cent. strength and being ground in the usual manner with a dispersing agent, dyes cellulose acetate rayon pure blue tints of excellent fastness to light.

*Example 2*

50 parts of 1:4-diaminoanthraquinone-2-aldehyde are heated in 200 parts of nitrobenzene with 20 parts of aniline for ½ hours at 100° C. The dyestuff is precipitated by cooling or by means of alcohol, and separated by filtration. The dyestuff, which is substantially identical with that of Example 1, dissolves in organic solvents with a pure blue coloration and dyes, when suitably pasted, cellulose acetate rayon pure blue tints having good properties of fastness. Instead of nitrobenzene another solvent may be used. Instead of aniline another aromatic amine, for example, paraphenylene diamine or dimethyl-paraphenylene diamine may be used.

Similar dyestuffs can also be obtained by using, instead of aniline, alkyl-, hydroxyalkyl-, cycloalkyl- or aralkyl-amines, for example, butylamine, hydroxyethylamine, hexahydroaniline or benzylamine.

*Example 3*

10 parts of 1-amino-4-nitro-anthraquinone-2-aldehyde are heated in 60 parts of ethanolamine at about 75° C. for ¼ hour. The product is precipitated with 120 parts of alcohol, filtered, and dried to yield a dark powder which is very probably 1-amino-4-β-hydroxyethylamino-anthraquinone-2-hydroxyethyl-azomethine of the formula

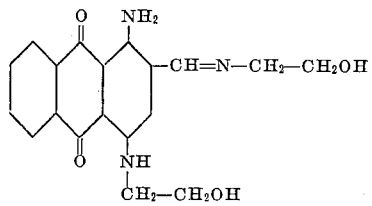

After reprecipitation from sulfuric acid of about 65 per cent. strength and being ground in the usual manner with a dispersing agent, it dyes cellulose acetate rayon blue tints.

*Example 4*

9 parts of 1-amino-4-bromanthraquinone-2-anil are heated in 40 parts of toluene sulfonamide with 20 parts of potassium acetate and 0.3 part of copper acetate for about 2 hours at 135–140° C. The product is precipitated, while hot, by means of 100 parts of ethyl alcohol, filtered when cold, washed with alcohol and water, and dried. The product is then dissolved in the cold in sulfuric acid of 90 per cent. strength, whereby the paratoluene sulfonic acid residue is split off, and the whole is poured on to ice. After being filtered and washed neutral, the resulting 1:4-diaminoanthraquinone-2-anil can be ground with a dispersing agent directly to form a paste by means of which pure blue tints having good properties of fastness are obtained on cellulose acetate rayon and nylon.

What we claim is:

1. As an acetate rayon dyestuff suitable for dyeing by the dispersion method, an anthraquinone azomethine of the general formula

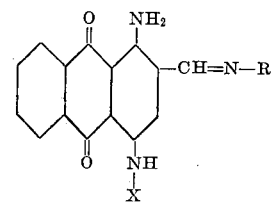

wherein X stands for a member selected from the group consisting of hydrogen, a lower alkyl radical and a lower hydroxy alkyl radical, and R stands for a member selected from the group consisting of a phenyl radical, a lower alkyl radical and a lower hydroxy alkyl radical.

2. As an acetate rayon dyestuff suitable for dyeing by the dispersion method, an anthraquinone-azomethine of the general formula

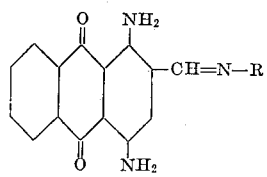

wherein R stands for a lower alkyl radical.

3. As an acetate rayon dyestuff suitable for dyeing by the dispersion method, the anthraquinone-azomethine of the formula

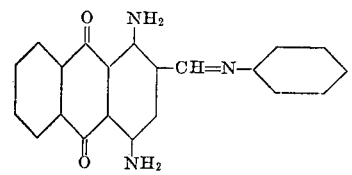

4. As an acetate rayon dyestuff suitable for dyeing by the dispersion method, the anthraquinone-azomethine of the formula

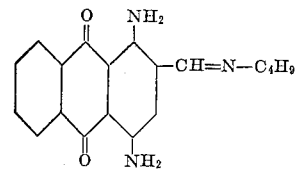

5. As an acetate rayon dyestuff suitable for dyeing by the dispersion method, the anthraquinone-azomethine of the formula

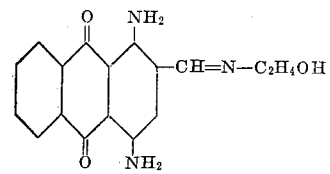

6. As an acetate rayon dyestuff suitable for dyeing by the dispersion method, an anthraquinone-azomethine of the general formula
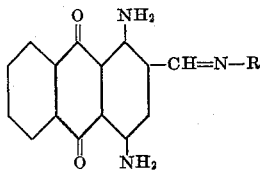
wherein R stands for a lower hydroxy alkyl radical.
PAUL GROSSMANN.
WALTER KERN.
REFERENCES CITED
The following references are of record in the file of this patent:
UNITED STATES PATENTS
| Number | Name | Date |
|---|---|---|
| 1,987,747 | Nawiasky et al. | Jan. 15, 1935 |
FOREIGN PATENTS
| Number | Country | Date |
|---|---|---|
| 359,138 | Germany | Sept. 21, 1922 |